(12) United States Patent
Alieiev et al.

(10) Patent No.: US 11,749,118 B2
(45) Date of Patent: Sep. 5, 2023

(54) VEHICLES, NETWORK COMPONENT, APPARATUSES, METHODS AND COMPUTER PROGRAMS FOR A VEHICLE, FOR A PLATOONING VEHICLE, AND FOR A NETWORK COMPONENT

(71) Applicant: MAN TRUCK & BUS SE, Munich (DE)

(72) Inventors: Roman Alieiev, Stendal (DE); Teodor Buburuzan, Braunschweig (DE); Joakim Cerwall, Stockholm (SE); Ernst Zielinski, Bochum (DE); Thorsten Hehn, Ingolstadt (DE)

(73) Assignee: MAN TRUCK & BUS SE, Munich (DE)

( * ) Notice: Subject to any disclaimer, the term of this patent is extended or adjusted under 35 U.S.C. 154(b) by 209 days.

(21) Appl. No.: 17/269,457

(22) PCT Filed: Aug. 23, 2019

(86) PCT No.: PCT/EP2019/072559
§ 371 (c)(1),
(2) Date: Feb. 18, 2021

(87) PCT Pub. No.: WO2020/039058
PCT Pub. Date: Feb. 27, 2020

(65) Prior Publication Data
US 2021/0256854 A1    Aug. 19, 2021

(30) Foreign Application Priority Data
Aug. 23, 2018 (EP) .................................. 18190542

(51) Int. Cl.
G08G 1/00 (2006.01)
H04W 4/46 (2018.01)
(Continued)

(52) U.S. Cl.
CPC ............. *G08G 1/22* (2013.01); *G08G 1/0112* (2013.01); *H04W 4/46* (2018.02); *H04W 84/18* (2013.01)

(58) Field of Classification Search
CPC ......... G08G 1/22; G08G 1/0112; H04W 4/46; H04W 84/18; H04W 4/02
(Continued)

(56) References Cited

U.S. PATENT DOCUMENTS 9,632,507 B1 * 4/2017 Korn ..................... B60W 30/00
2010/0256836 A1 10/2010 Mudalige et al.
(Continued)

FOREIGN PATENT DOCUMENTS

WO    2015047174 A1    4/2015

*Primary Examiner* — Hirdepal Singh
(74) *Attorney, Agent, or Firm* — 2SPL Patentanwälte PartG mbB; Kieran O'Leary

(57) ABSTRACT

Embodiments relate to vehicles, apparatuses, methods and computer programs for a vehicle, for a platooning vehicle, and for a network component. The apparatus (10) for a vehicle (100) comprises one or more interfaces (12) configured to communicate in a mobile communication system (400), and a control module (14) configured to control the one or more interfaces (12). The control module (14) is further configured to receive one or more messages from one or more vehicles. The one or more messages comprise information on at least a velocity and a location of a vehicle. The control module (14) is configured to detect whether a potential intruder for a platoon of vehicles is present based on the one or more messages from the one or more vehicles and based on a warning message trigger condition. The control module (14) is configured to generate a warning message in case a potential intruder is detected, and to communicate the warning message to one or more other vehicles.

20 Claims, 5 Drawing Sheets

(51) Int. Cl.
*G08G 1/01* (2006.01)
*H04W 84/18* (2009.01)

(58) Field of Classification Search
USPC .......................................................... 340/905
See application file for complete search history.

(56) References Cited

U.S. PATENT DOCUMENTS

| | | |
|---|---|---|
| 2011/0010446 A1 | 1/2011 | Chen et al. |
| 2016/0171894 A1* | 6/2016 | Harvey .................. B60Q 1/508 |
| | | 701/23 |
| 2018/0096602 A1 | 4/2018 | She et al. |
| 2018/0253976 A1* | 9/2018 | Inam ........................ G08G 1/22 |

* cited by examiner

VEHICLES, NETWORK COMPONENT, APPARATUSES, METHODS AND COMPUTER PROGRAMS FOR A VEHICLE, FOR A PLATOONING VEHICLE, AND FOR A NETWORK COMPONENT

CROSS-REFERENCE TO RELATED APPLICATIONS

This application is a 35 U.S.C. § 371(c) national stage entry of PCT/EP2019/072559, filed on Aug. 23, 2019. That application claimed priority to European Application 18190542.3, filed on Aug. 23, 2018. The contents of the earlier filed applications are incorporated by reference herein in their entirety.

FIELD

The present invention relates to vehicles, apparatuses, methods and computer programs for a vehicle, for a platooning vehicle, and for a network component, more particularly, but not exclusively, to a concept for early detection of a platoon intruder.

BACKGROUND

Automated or autonomous driving is a field of research and development. One concept of dealing with high traffic loads is platooning, in which vehicles are grouped and which may allow making more efficient use of the road capacity. The groups of vehicles, also referred to as convoys or platoons, may be used to operate the vehicles in the platoon with a short distance or headway between the vehicles, as the vehicles within the platoon may react within a short time delay or simultaneously. This can be achieved by control mechanisms being active between the vehicles of the platoon.

For example, in the scope of centralised vehicular platooning, a centralized controller sends commands to the members of the platoons through wireless communications. When it comes to high-density platooning, the inter-vehicle distance is reduced to its minimum. These challenging small headways require the monitoring of global (of the whole platoon) and local performances (of each vehicle in the platoon) to provide a level of responsivity and adaptiveness consistent with this safety critical application.

Document DE 10 2006 057 982 A1 describes a concept for monitoring and adapting an overtaking manoeuvre. Document WO 2016/182489 A1 describes a concept for controlling an exit of a vehicle from a platoon. Document WO 2017/164792 A1 describes a method for controlling a platooning operation of a platoon. Document WO2017/210200 A1 describes a concept for controlling a vehicle to closely follow another vehicle using automatic or partially automatic control.

There is a demand for an improved concept for controlling a platoon. The independent claims provide an improved concept for controlling a platoon.

SUMMARY

Embodiments are based on the finding that vehicles outside a platoon can be used for early intruder detection. In a platoon distances between the platooning vehicles may be reduced to a minimum, which allows efficient operation of the vehicles and fulfills safety requirements, e.g. for emergency brake maneuvers. These distances may be too small to let a passing vehicle merge (intruder from the platoon perspective), e.g. in case of oncoming traffic. It is a finding that early detection of an intruder enables a more efficient and safer reaction of a platoon. For example, vehicles moving at speeds higher than an average speed of other vehicles in a certain traffic scenario behind a platoon can be detected. Nearby platoons can be informed about the faster vehicle, which is likely to overtake or pass the platoon. The platooning vehicles may then react to the potential intruder earlier, e.g. by opening up merging gaps within the platoon, by delaying of closing such gaps during a platoon maneuver, by delaying lane changes, or by delaying the formation of a platoon until the potential intruder has moved on.

Embodiments provide an apparatus for a vehicle. The apparatus comprises one or more interfaces configured to communicate in a mobile communication system. The apparatus further comprises a control module configured to control the one or more interfaces. The control module is further configured to receive one or more messages from one or more vehicles. The one or more messages comprise information on at least a velocity and a location of a vehicle. The control module is further configured to detect whether a potential intruder for a platoon of vehicles is present based on the one or more messages from the one or more vehicles and based on a warning message trigger condition. The control module is further configured to generate a warning message in case a potential intruder is detected, and to communicate the warning message to one or more other vehicles. Embodiments may enable early intruder detection and warning.

In some embodiments the control module may be configured to detect the potential intruder further based on the sensor data of the vehicle, for example, optical, radar or other sensors may be used to determine a passing vehicle. Embodiments may enable a more reliable detection by using sensor data of the vehicle. The one or more messages from the one or more vehicles may include information on sensor data of the other vehicles. The control module is then configured to detect the potential intruder further based on the information on the sensor data from other vehicles. Embodiments may enable intruder detection using sensor data of vehicles and/or other vehicles.

In embodiments the control module may be configured to determine the warning message trigger condition further based on one or more elements or a combination of the elements of the group of a configuration message received from another vehicle, a configuration message received from a vehicle within a platoon, a configuration message received from a network component, and a traffic condition of the vehicle. Embodiments may enable different mechanisms for configuring a warning message trigger condition in a vehicular network. For example, the control module may be configured to communicate information on the warning message trigger condition with at least one other vehicle. Embodiments may enable information exchange on trigger conditions among vehicles. The control module may be configured to establish a multi hop vehicular network with surrounding vehicles. Embodiments may enable formation of an ad hoc or multi hop vehicular network for intruder detection.

In further embodiments the control module may be configured to limit the multi hop network by a maximum number of tiers of vehicles. The information on the maximum number of tiers of vehicles may be based on one or more elements or a combination of the elements of the group of a configuration message received from another vehicle, a configuration message received from a vehicle within a platoon, a configuration message received from a network component, and a traffic condition of the vehicle. Embodiments may enable different options for the configuration of an ad hoc or multi hop vehicular network.

In some embodiments the control module may be configured to detect whether the potential intruder is present upon request from the platooning vehicle. Embodiments may enable intruder detection upon request from a platooning vehicle. The control module may be configured to detect the potential intruder for the platoon by determining whether a vehicle is going to overtake or pass the platoon. Embodiments may enable a warning mechanism for a platoon to warn in case of passing or overtaking vehicles, as the case may be upon request from a platoon.

Embodiments also provide an apparatus for a platooning vehicle. The vehicle is a member of a platoon of vehicles. The apparatus comprises one or more interfaces configured to communicate in a mobile communication system. The apparatus comprises a control module configured to control the one or more interfaces, wherein the control module is further configured to receive a warning message from a vehicle. The warning message comprises information on a detection of a potential intruder at the vehicle. The control module is further configured to initiate one or more precautionary functions for the intruder. Embodiments may allow a platooning vehicle to receive and react to early warning messages on potential intruders of the platoon.

In some embodiments the control module may be configured to generate a configuration message for one or more vehicles outside the platoon. The configuration message comprises information on a warning message trigger condition, which instructs the vehicles outside the platoon to generate the warning message in case a potential intruder for the platoon is detected. The control module may be further configured to communicate information on the configuration message to one or more vehicles outside the platoon using the one or more interfaces. Embodiments may enable a platooning vehicle to configure an early intruder detection mechanism. For example, the control module may be further configured to include information on establishing a multi hop network among vehicles outside the platoon for generating a warning message on potential intruders. Platooning vehicles may be enabled to configure a multi hop network for early intruder detection using vehicles outside the platoon.

Embodiments also provide a vehicle comprising one or more of the above apparatuses.

Embodiments also provide an apparatus for a network component. The network component is comprised in a vehicular network using platooning. The apparatus comprises one or more interfaces configured to communicate in a mobile communication system. The apparatus further comprises a control module configured to control the one or more interfaces. The control module is further configured to communicate traffic information with one or more vehicles using the one or more interfaces, and to determine a warning message trigger condition for triggering transmission of a warning message based on the traffic information. The warning message comprises information on a detection of a potential intruder for a platoon at the vehicle. The control module is further configured to communicate information on the warning message trigger condition to one or more vehicles. Embodiments enable a central evaluation of trigger conditions for a warning message using a network component at which traffic information of a plurality of vehicle is available. For example, the control module may be configured to determine different warning message trigger conditions depending on different traffic conditions of the one or more vehicles. Embodiments may enable trigger condition adaptation depending on traffic conditions.

In embodiments, the information on the warning message trigger condition may comprise information indicating that the trigger condition was fulfilled. Embodiments may hence enable an intruder detection mechanism at a network component, which may collect data from the vehicles. Based on said data the trigger condition may be determined. Embodiments may then enable communicating information on the trigger condition to vehicles such that the warning message can be generated at one or more vehicles subsequently, e.g. by one or more vehicles in the vicinity of a platoon. In other embodiments the warning message may be generated directly at the network component and then communicated to one or more vehicles, e.g. directly to one or more vehicles of the platoon. Some embodiments may hence enable trigger condition evaluation and warning message generation at a network component, which may be particularly beneficial if the network component is implemented at the edge of the network enabling low latencies.

Embodiments also provide a network component comprising one or more of the above apparatuses. Another embodiment is a system comprising at least two embodiments of the above apparatus for a vehicle, the apparatus for a platooning vehicle, and the network component.

Another embodiment is a method for a vehicle. The method comprises receiving one or more messages from one or more vehicles. The messages comprise information on at least a velocity and a location of a vehicle. The method further comprises detecting whether a potential intruder for a platoon of vehicles is present based on the one or more messages from the one or more vehicles and based on a warning message trigger condition. The method further comprises generating a warning message in case a potential intruder is detected, and communicating the warning message to one or more other vehicles.

Yet another embodiment is a method for a platooning vehicle. The platooning vehicle is a member of a platoon of vehicles. The method comprises receiving a warning message from a vehicle. The warning message comprises information on a detection of a potential intruder at the vehicle. The method further comprises initiating one or more precautionary functions for the intruder.

Another embodiment is a method for a network component. The network component is comprised in a vehicular network using platooning. The method comprises communicating traffic information with one or more vehicles. The method further comprises determining a warning message trigger condition for triggering transmission of a warning message based on the traffic information. The warning message comprises information on a detection of a potential intruder for a platoon at the vehicle. The method further comprises communicating information on the warning message trigger condition to one or more vehicles.

Another embodiment is a method for a system comprising at least two of the above methods.

Embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

BRIEF DESCRIPTION OF THE FIGURES

Some other features or aspects will be described using the following non-limiting embodiments of apparatuses or methods or computer programs or computer program products by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
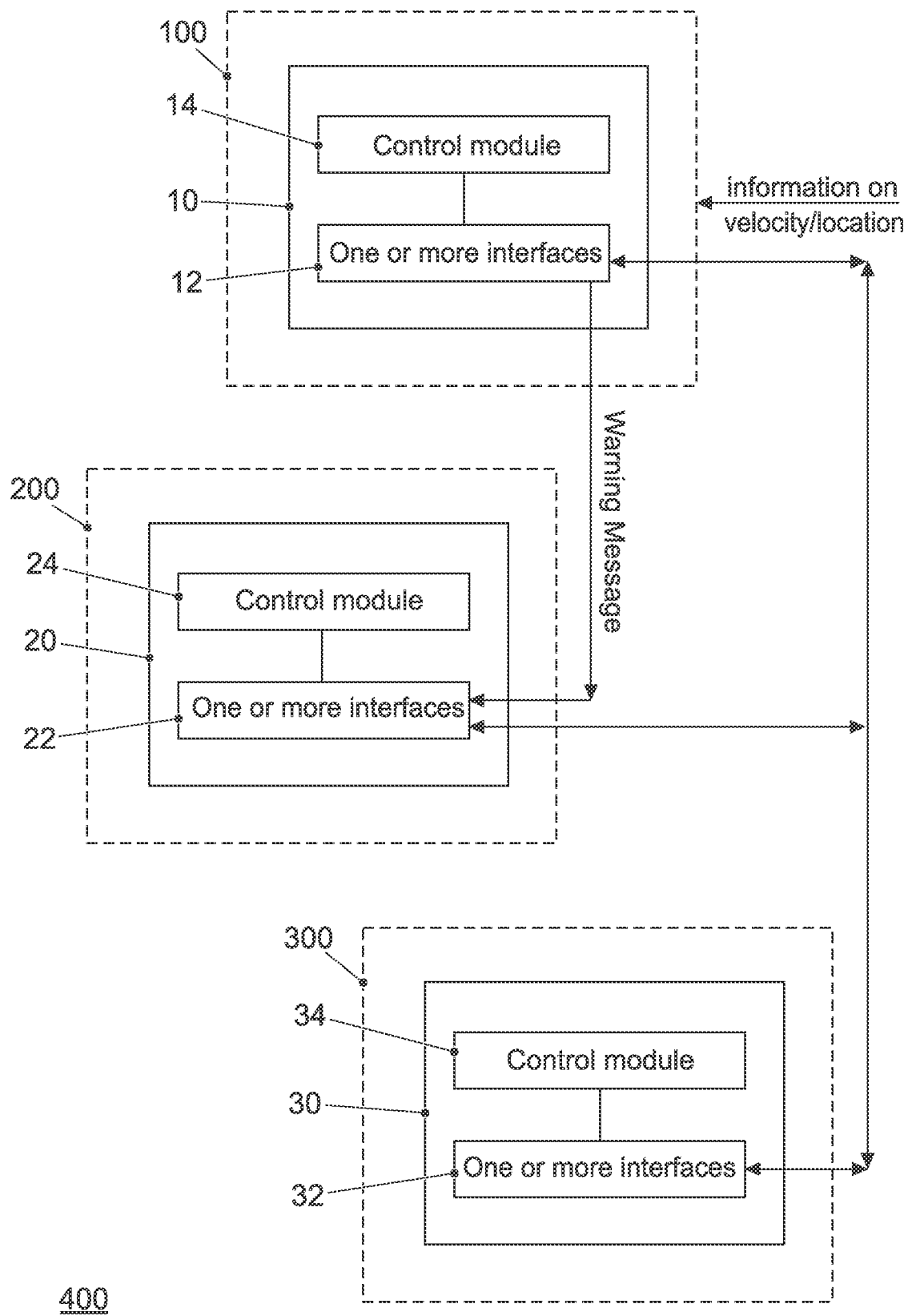
FIG. 1 illustrates an embodiment of an apparatus for a vehicle, an embodiment of an apparatus for a platooning vehicle, an apparatus for a network component, and an embodiment of a system.

FIG. 1 illustrates an embodiment of an apparatus 10 for a vehicle 100. The apparatus 10 is configured to, adapted to or suitable to be used in a vehicle. Embodiments also provide a vehicle 100 comprising an embodiment of the apparatus 10. The apparatus 10 comprises one or more interfaces 12 configured to communicate in a mobile communication system 400, and a control module 14 configured to control the one or more interfaces 12. The control module 14 is further configured to receive one or more messages from one or more vehicles. The one or more messages comprise information on at least a velocity and a location of a vehicle. The control module 14 is configured to detect whether a potential intruder for a platoon of vehicles is present based on the one or more messages from the one or more vehicles and based on a warning message trigger condition. The control module 14 is configured to generate a warning message in case a potential intruder is detected, and the control module 14 is configured to communicate the warning message to one or more other vehicles. In embodiments vehicles outside the platoon may monitor traffic based on the messages. If a vehicle is detected, which is likely to pass or overtake a platoon, the warning message can be generated and communicated to the platoon in advance by the apparatus 10.

FIG. 1 also illustrates an embodiment of an apparatus 20 for a platooning vehicle 200. The platooning vehicle 200 is a member of a platoon of vehicles. FIG. 1 also shows an embodiment of a platooning vehicle 200 comprising the embodiment of the apparatus 20. The apparatus 20 comprises one or more interfaces 22 configured to communicate in a mobile communication system 400. The apparatus 20 further comprises a control module 24, which is configured to control the one or more interfaces 22. The control module 24 is further configured to receive a warning message from a vehicle 100. The warning message comprises information on a detection of a potential intruder at the vehicle 100. The control module 24 is further configured to initiate one or more precautionary functions for the intruder. In embodiments vehicles inside a platoon may receive one or more warning messages on one or more potential intruders from vehicles outside the platoon. Precautionary measures may then be one or more elements of the group of opening up a gap, initiating a braking maneuver, slowing down a platoon forming maneuver, an emergency brake maneuver, delaying certain maneuvers, etc.

FIG. 1 further illustrates an apparatus 30 for a network component 300, and an embodiment of a network component 300 comprising the embodiment of the apparatus 30. The network component 300 is comprised in a vehicular network using platooning. The apparatus 30 comprises one or more interfaces 32 configured to communicate in a mobile communication system 400. The apparatus 30 further comprises a control module 34 configured to control the one or more interfaces 32. The control module 34 is further configured to communicate traffic information with one or more vehicles using the one or more interfaces 32. The control module 34 is further configured to determine a warning message trigger condition for triggering transmission of a warning message based on the traffic information. The warning message comprises information on a detection of a potential intruder for a platoon at a vehicle 100. The control module 34 is further configured to communicate information on the warning message trigger condition to one or more vehicles 100.

In some embodiments the trigger condition for the warning message may be determined at the network component 300. The network component 300 may have additional information on traffic situations, traffic load, platoons formed, etc.

In some embodiments, the control module 34 of the network component 300 may be configured to determine warning messages itself and then forward the warning messages to the platoon. An evaluation on whether the trigger condition is fulfilled may then be carried out by the control module 34 of the network component 300. The information on the warning message trigger condition communicated may comprise information indicating that the trigger condition was fulfilled. An intruder detection mechanism is then in place at the network component 300 based on collected data from the vehicles. Based on said data the trigger condition may be determined. The network component 300 may be located at the edge of the network 400, e.g. in a base station. In such embodiments low latency processing and message generation may result in addition to making data from a plurality of vehicles (platooning and non-platooning) available at a central network component 300. Such embodiments may allow generating a wider traffic overview and enhanced statistical evaluations.

In other embodiments the trigger condition may be determined at the vehicles, e.g. in terms of a distributed algorithm potentially using artificial intelligence concepts. In further embodiments the trigger condition may be determined at the platooning vehicle 200. From the perspective of the apparatus 10 at the vehicle 100 the control module 14 may be configured to determine the warning message trigger condition further based on one or more elements or a combination of the elements of the group of a configuration message received from another vehicle, a configuration message received from a vehicle 200 within a platoon, a configuration message received from a network component 300, and a traffic condition of the vehicle 100.

From the perspective of the platooning vehicle 200 the control module 24 at the apparatus 20 may be configured to generate a configuration message for one or more vehicles 100 outside the platoon. In such embodiments the platooning vehicle 200, the apparatus 20, respectively, assumes the role of configuring the trigger condition. The configuration message comprises information on a warning message trigger condition, which instructs the vehicle 100 outside the platoon to generate the warning message in case a potential intruder for the platoon is detected. The control module 24 at the apparatus 20 is then configured to communicate information on the configuration message to one or more vehicles outside the platoon using the one or more interfaces 22.

FIG. 1 further illustrates an embodiment of a system 400 comprising the vehicle 100, the platooning vehicle 200 and the network component 300.

In embodiments the one or more interfaces 12, 22, 32 may correspond to any means for obtaining, receiving, transmitting or providing analog or digital signals or information, e.g. any connector, contact, pin, register, input port, output port, conductor, lane, etc. which allows providing or obtaining a signal or information. An interface may be wireless or wireline and it may be configured to communicate, i.e. transmit or receive signals, information with further internal or external components. The one or more interfaces 12, 22, 32 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 12, 22, 32 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 12, 22, 32 may serve the purpose of transmitting or receiving or both, transmitting and receiving, information, such as information related to capabilities, application requirements, requests, message interface configurations, feedback, information related to control commands etc.

As shown in FIG. 1 the respective one or more interfaces 12, 22, 32 are coupled to the respective control modules 14, 24, 34 at the apparatuses 10, 20, 30. In embodiments the control modules 14, 24, 34 may be implemented using one or more processing units, one or more processing devices, any means for processing, such as a processor, a computer or a programmable hardware component being operable with accordingly adapted software. In other words, the described functions of the control modules 14, 24, 34 may as well be implemented in software, which is then executed on one or more programmable hardware components. Such hardware components may comprise a general purpose processor, a Digital Signal Processor (DSP), a micro-controller, etc.

FIG. 1 also shows an embodiment of a system 400 comprising embodiments of the network component 300 and vehicles 100, 200, which may correspond to a network controller/server or base station 300 and mobile transceivers/vehicles 100, 200, respectively. In embodiments, communication, i.e. transmission, reception or both, may take place among mobile transceivers/vehicles 100, 200 directly and/or between mobile transceivers/vehicles 100, 200 and a network infrastructure component 300 (e.g. a base station, a network server, a backend server, etc.). Such communication may make use of a mobile communication system 400. In other words such communication may be carried out directly, e.g. by means of Device-to-Device (D2D) communication, which may also comprise Vehicle-to-Vehicle (V2V) or car-to-car communication in case of vehicles 100, 200. Such communication may be carried out using the specifications of a mobile communication system 400.

The mobile communication system 400 may, for example, correspond to one of the Third Generation Partnership Project (3GPP)-standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved- UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable or configured to communicate with one or more active mobile transceivers/vehicles 100, 200 and a base station transceiver can be located in or adjacent to a coverage area of another base station transceiver, e.g. a macro cell base station transceiver or small cell base station transceiver. Hence, embodiments may provide a mobile communication system 400 comprising two or more mobile transceivers/vehicles 100, 200 and one or more base station transceivers, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, a vehicle etc. A mobile transceiver may also be referred to as User Equipment (UE) or mobile in line with the 3GPP terminology. A vehicle 100, 200 may correspond to any conceivable means for transportation, e.g. a car, a bike, a motorbike, a van, a truck, a bus, a ship, a boat, a plane, a train, a tram, etc.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 100, 200 can be associated with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 100, 120 may communicate directly with each other, i.e. without involving any base station transceiver, which is also referred to as Device-to-Device (D2D) communication. An example of D2D is direct communication between vehicles, also referred to as Vehicle-to-Vehicle communication (V2V), car-to-car using 802.11p, respectively. In embodiments the one or more interfaces 12, 22, 32 can be configured to use this kind of communication. In order to do so radio resources are used, e.g. frequency, time, code, and/or spatial resources, which may as well be used for wireless communication with a base station transceiver. The assignment of the radio resources may be controlled by the base station transceiver, i.e. the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4). In embodiments the two or more mobile transceivers 100, 200 as indicated by FIG. 1 may be registered in the same mobile communication system 400. In other embodiments one or more of the mobile transceivers 100, 200 may be registered in different mobile communication systems 400. The different mobile communication systems 400 may use the same access technology but different operators or they may use different access technologies as outlined above.

Figure 2:
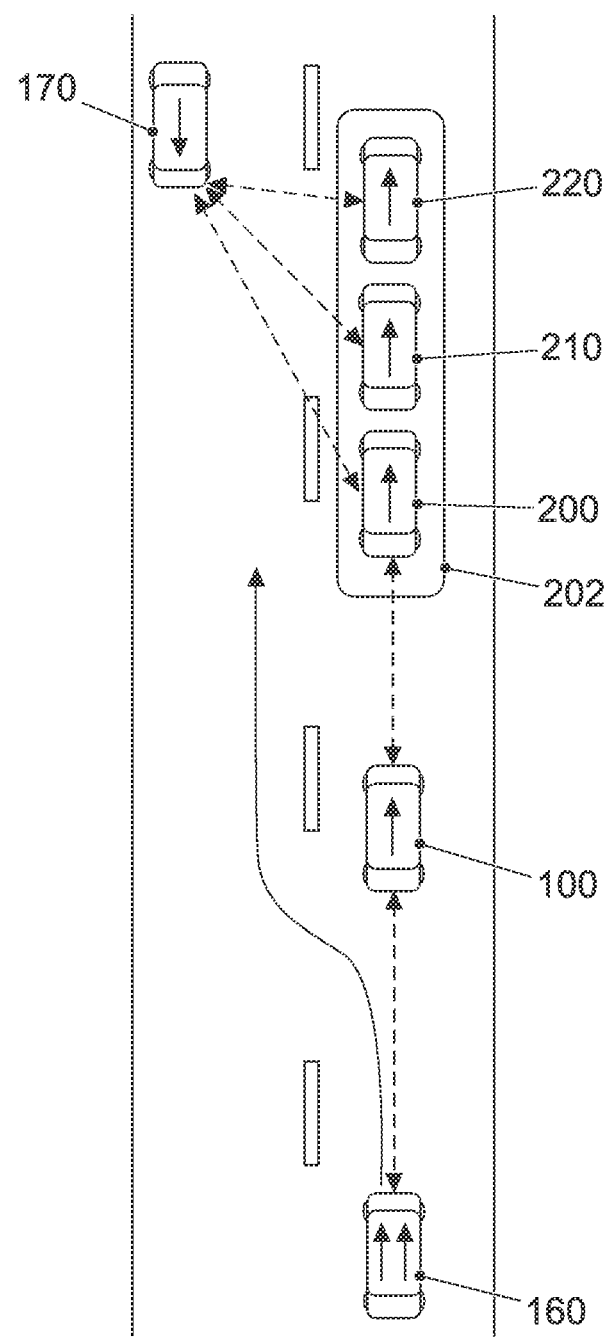
FIG. 2 shows a traffic scenario of an embodiment at a first time instant.
Figure 3:
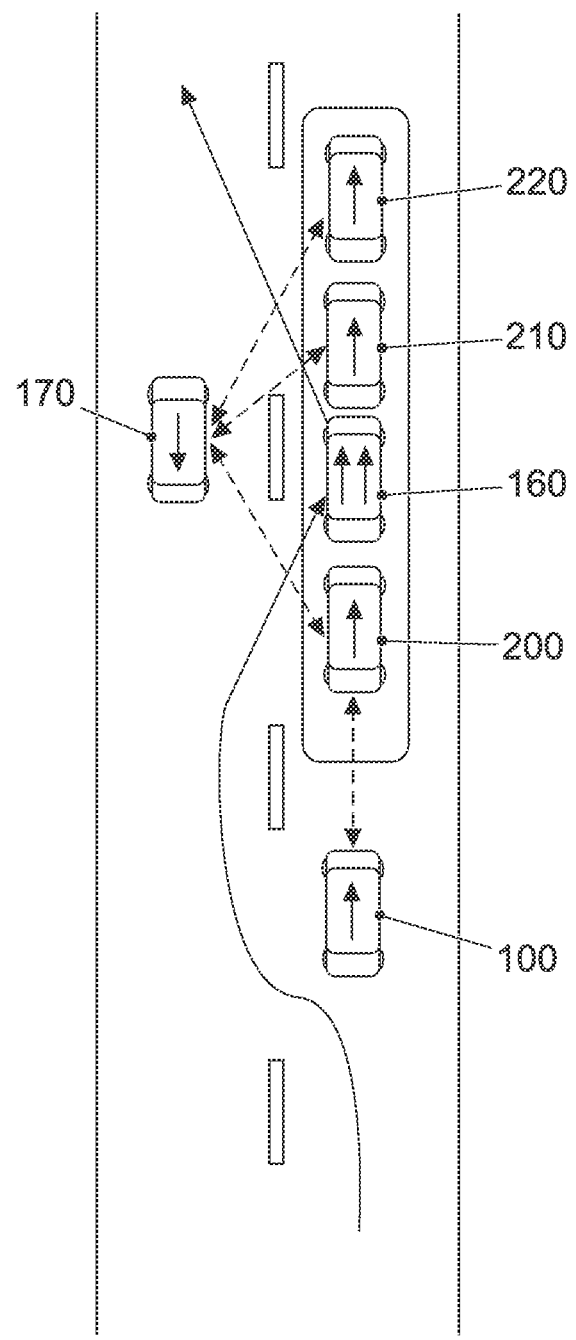
FIG. 3 shows the traffic scenario of FIG. 2 at a later second time instant.

FIGS. 2 and 3 illustrate a traffic scenario of an embodiment at a first and a later second time instant. Both Figs. show a two lane road scenario in which a vehicle 100 drives behind a platoon 202, which is formed by vehicles 200, 210, and 220. It can be assumed that the vehicles 200, 210, 220 of the platoon 202 are trucks. It is further assumed that vehicle 100 drives at the same velocity as the platoon 202 (indicated by the single arrows within the silhouettes of the vehicles). As can be seen from FIG. 2 the distances between vehicles 200, 210, 202 in the platoon 202 are narrow, which provides efficiency benefits for the platoon.

Forming and driving vehicles in platoons 202 has shown many advantages for transportation systems. It allows fuel reduction by reducing drag force, while coordinated driving allows more efficient braking and acceleration maneuvers; additionally the road operator may also benefit from trucks driving in platoons 202 since they occupy less space on the road.

The efficiency of the platoon may dramatically degrade if the involved trucks cannot follow the desired coordination rules, such as to maintain the optimal distance. If the distance between the trucks is sufficiently large, it is possible that some other vehicle (intentionally or unintentionally) may drive-in and position itself in-between the platoon vehicles. This may be a reaction of the platoon 202 to keep a passing vehicle 160 safe. In FIG. 2 vehicle 100 detects the faster vehicle 160 approaching from behind. This detection is carried out by receiving one or more messages from the vehicle 160 at the vehicle 100. The vehicle 100 then sends out an according warning message to vehicle 200 of the platoon. Vehicle 200 knows about vehicle 170 which is driving in the other direction and creates a potential risk for vehicle 160. Vehicle 200 hence initiates an according collision avoidance procedure in the platoon 202, which results in opening a gap between vehicles 200 and 210 for the intruder vehicle 160 to drive-in. FIG. 3 shows the traffic scenario of FIG. 2 at a later second time instant at which the vehicle 160 has driven into the gap and vehicle 170 passes. In embodiments other maneuvers of the platoon or the platooning vehicles are conceivable, some examples are opening up merging gaps within the platoon, delaying of closing such gaps during a platoon maneuver, delaying lane changes, or delaying the formation of a platoon until the potential intruder has moved on, etc.

In this embodiment the velocity of the intruder 160 was the criteria based on which vehicle 160 was detected to be an intruder. In other embodiments other criteria may be considered, for example, lane changes of vehicles, general traffic behavior of a vehicle or vehicles around a potential intruder, the environment (highway, urban, downtown), etc. Moreover, some embodiments may apply learning algorithms, which may determine an improved criterion or combination of criteria for intruder detection.

Some embodiments may differentiate an intruder by its ability to communicate and cooperate with other road partners, i.e. to distinguish between "cooperative" and "non-cooperative" intruders. It is assumed that the "cooperative" intruder enters the platoon unintentionally (for example to avoid a collision on the road) and is willing to cooperate with platoon via V2X or C-V2X to reduce possible negative impact.

The situation may be significantly more challenging if the intruder is not "cooperative" or has no communication capabilities. To maintain the high platoon efficiency in this situation, it may be important to detect the intruder as soon as possible and then to react on it in a timely manner without any interaction with intruder itself, as described above. Intruder-detection methods in embodiments may be based, for example, on the comparison of the obtained sensor information from the side sensors and the frontal sensors in a platoon truck or from vehicle 100 itself. The control module 14 may be configured to detect the potential intruder further based on the sensor data of the vehicle 100. The apparatus 10, the vehicle 100, respectively, may comprise one or more sensors, e.g. optical, acoustical, radar, lidar (light detection and ranging), etc. Such sensors or information on their data may be coupled to the control module 14 for further processing. Such sensor data may form the basis for detection of a potential intruder.

In some embodiments the messages from other vehicles may include information on sensor data of the other vehicles. The control module 14 of the apparatus 10 in the vehicle 100 may then be configured to detect the potential intruder further based on the information on the sensor data, its own and/or from the other vehicles. Embodiments may enable intruder detection using sensor data of vehicles and/or other vehicles. For example, when the same object is being detected by both sensors, then the warning signal or message about the potential intruder 160 is created. The remaining reaction plan can be characterized, for example, by increasing or reducing the inter-vehicle distance (vehicles 200, 210) in the platoon 202. Embodiments may enable an earlier detection of non-cooperative intruder using sensor data of vehicles outside the platoon 202.

Some embodiments may use a two stage approach of early intruder detection. Often an intruder is a vehicle 160, which, due to some reason (oncoming vehicle 170 in FIGS. 2 and 3), is forced to interrupt the platoon 202. This means that there might be a preceding event which resulted in an unexpected reaction of the vehicle 160. Embodiments may take into consideration the fact, that such event and resulting vehicle's reaction may have a high likelihood to be observed by other road participants. If any of the road participants, which was able to detect such an event or behavior is enabled with communication capabilities, such information can be forwarded to the truck platoon 200 before the intruder 160 is being detected by the platoon 202 directly.

In another embodiment the actual procedure can be presented in the following way:

Stage 1: all/selected road participants constantly monitor the behavior of all vehicles located in the vicinity. Driving dynamics of each road participant is described by the intruder-likelihood scale ranging from, e.g. normal driving behavior to highly likely to become an intruder. Such observation can be conducted either constantly by some road participants or, for example, requested by the platoon 202 (platoon 202 sends request to some vehicles 100 located in the given part of the road or within certain distance behind the platoon). The control module 14 of the apparatus 10 may then be configured to detect whether the potential intruder is present upon request from the platooning vehicle 200. This request may be forwarded via multi-hop V2X, via Cellular link, 802.11p using the mobile communication system 400 to other relevant vehicles in the selected area. The control module 14 may be configured to communicate information on the warning message trigger condition with at least one other vehicle. For example, information on the warning message trigger condition may be forwarded to other vehicles or it may be received from another vehicle.

Stage 2: if any vehicle involved in the monitoring process detects a potential intruder, it forwards a warning message back to the platoon 202 in the similar manner as described in stage 1, the message may describe the detected intruder properties (likelihood of becoming an intruder, reasoning, etc.).

Finally, the platoon 202 receives the information that a certain vehicle, which is approaching, is marked at a potential intruder. The platoon 202 evaluates the obtained intruder description and proactively activates some intruder reaction/prevention mechanism before the intruder-vehicle actually started influencing the platoon efficiency.

In embodiments a multi hop or ad hoc network may hence be established around a platoon 202. The control module 14 at the apparatus 10 may be configured to establish a multi hop vehicular network with surrounding vehicles. For example, the control module 14 may be configured to limit the multi hop network by a maximum number of tiers (a predefined number of hops) of vehicles. The information on the maximum number of tiers of vehicles may be based on one or more elements or a combination of the elements of the group of a configuration message received from another vehicle, a configuration message received from a vehicle within a platoon, a configuration message received from a network component, and a traffic condition of the vehicle 100. Hence, in some embodiments a vehicle may determine an adequate size for the multi hop network itself or with the help of information exchanged with nearby other vehicles. A distributed configuration for the multi hop network and the trigger condition may be established, e.g. with a learning component. Such a learning component may use principles of artificial or distributed intelligence to adapt the multi hop network size and the trigger condition to the traffic condition or situation. Such embodiments may use geo-locations communicated between vehicles to base the trigger condition on.

In other embodiments the multi hop network size and the trigger condition may be determined by the platooning vehicle 200. In such embodiments the control module 24 of the apparatus 20 may be further configured to include information on establishing a multi hop network among vehicles outside the platoon for generating warning messages on potential intruders. In further embodiment the apparatus 30 and the control module 34 comprised therein may be accordingly configured. The network component 300 may be able to collect traffic information from a plurality of vehicles and to evaluate such traffic information. For example, statistical evaluation may be taken into account when determining information on a configuration of the trigger condition, such as time of day, day of week, whether conditions, load distribution along a route of the platoon 202, etc. The control module 34 may be configured to determine different warning message trigger conditions depending on different traffic conditions of the one or more vehicles.

For example, the control module 14 may be configured to detect the potential intruder 160 for the platoon 202 by determining whether a vehicle is going to overtake or pass the platoon. As mentioned above, in some embodiments the network component 300 may be located at a base station transceiver of the mobile communication system 400. Hence, the network component 300 may provide low latency services and the trigger condition may be evaluated and distributed at low latency, e.g. as part of edge computing in the mobile communication system 400.

Figure 4:
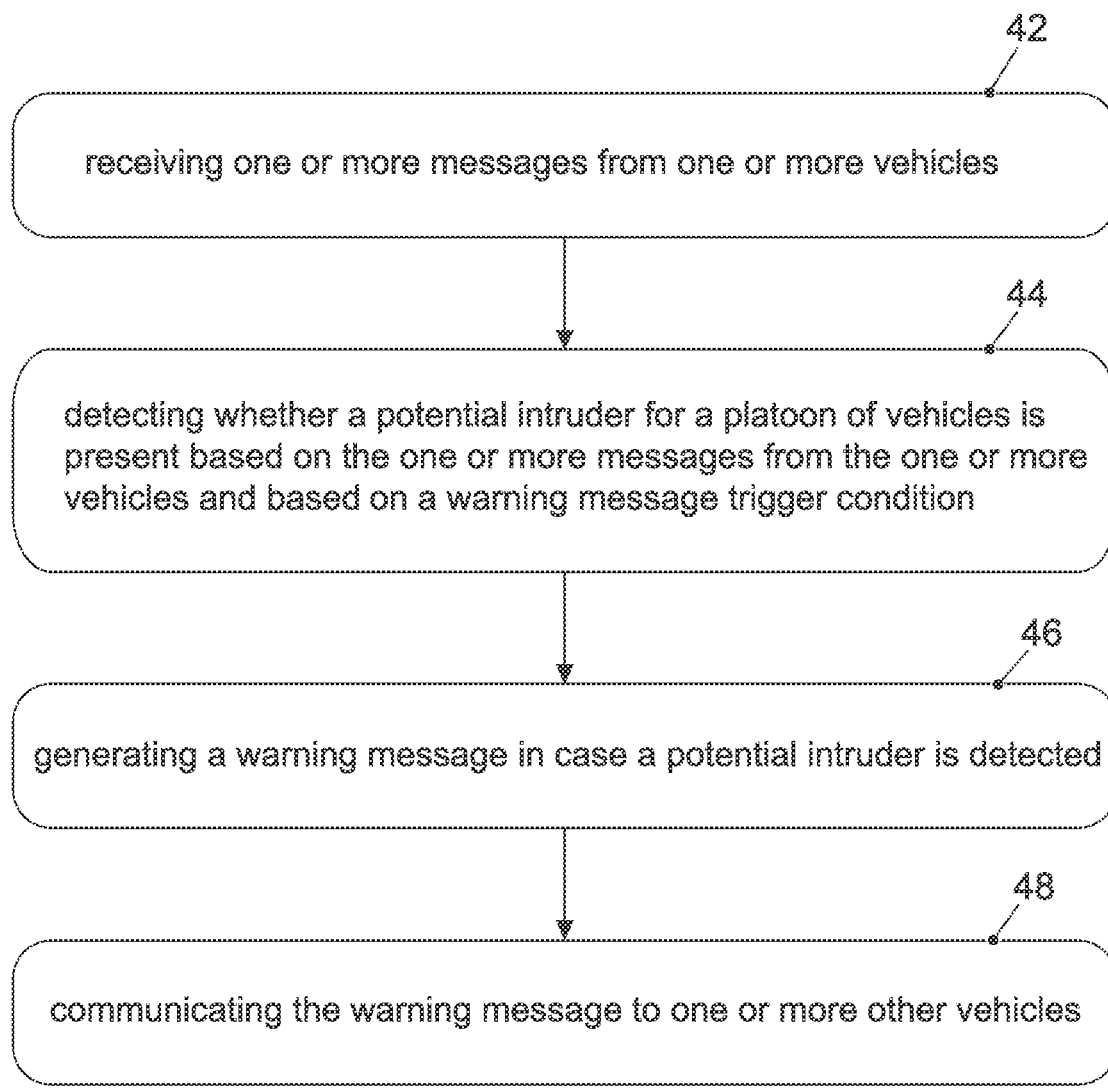
FIG. 4 shows a block diagram of a flow chart of an embodiment of a method for a vehicle.

FIG. 4 shows a block diagram of a flow chart of an embodiment of a method 40 for a vehicle 100. The method 40 for the vehicle 100 comprises receiving 42 one or more messages from one or more vehicles. The messages comprise information on at least a velocity and a location of a vehicle. The method 40 comprises detecting 44 whether a potential intruder 160 for a platoon 202 of vehicles 200, 210, 220 is present based on the one or more messages from the one or more vehicles and based on a warning message trigger condition. The method 40 comprises generating 46 a warning message in case a potential intruder is detected, and communicating 48 the warning message to one or more other vehicles.

Figure 5:
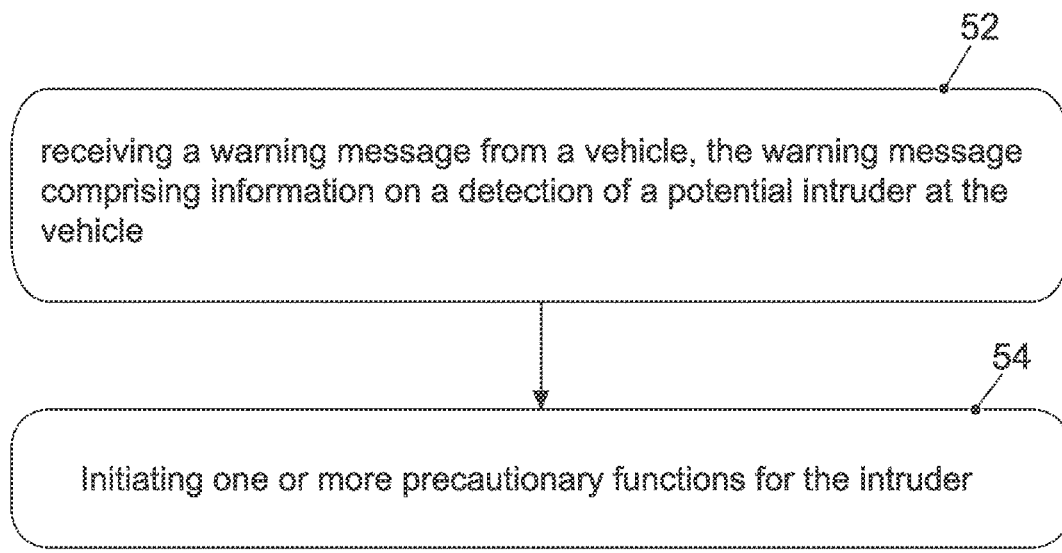
FIG. 5 shows a block diagram of a flow chart of an embodiment of a method for a platooning vehicle.

FIG. 5 shows a block diagram of a flow chart of an embodiment of a method 50 for a platooning vehicle 200. The platooning vehicle 200 is a member of a platoon 202 of vehicles. The method 50 for the platooning vehicle 200 comprises receiving 52 a warning message from a vehicle 100. The warning message comprises information on a detection of a potential intruder 160 at the vehicle 100. The method 50 further comprises initiating 54 one or more precautionary functions for the intruder 160.

Figure 6:
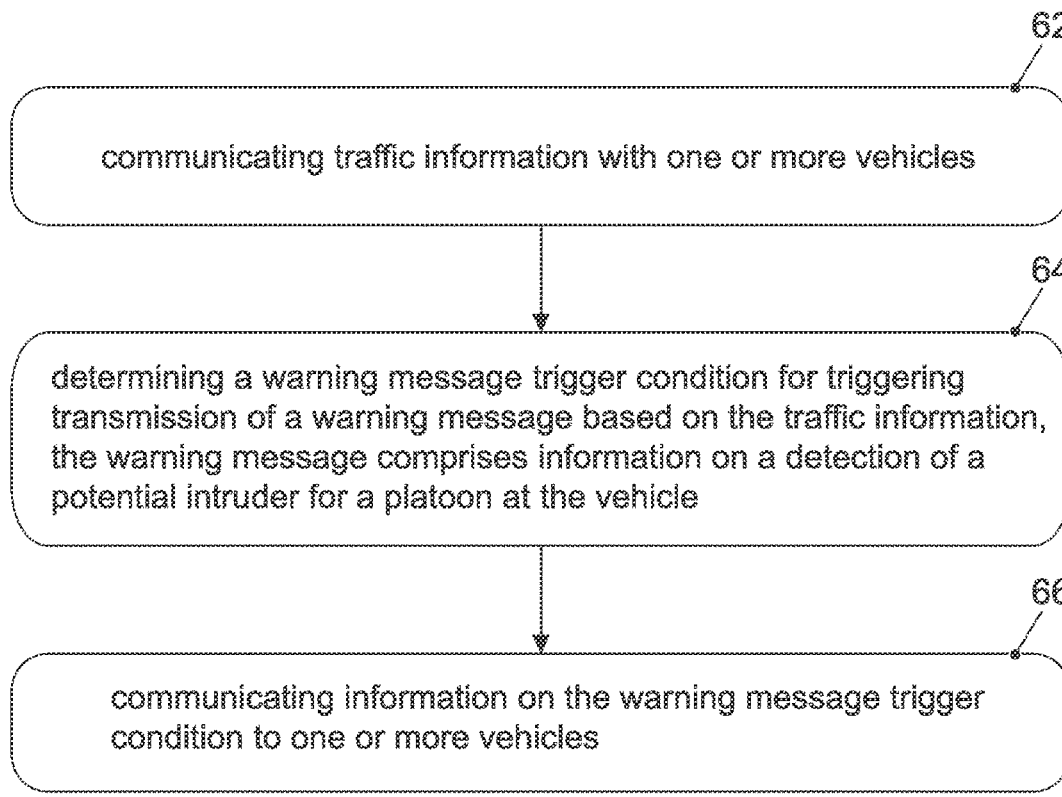
FIG. 6 shows a block diagram of a flow chart of an embodiment of a method for a network component.

FIG. 6 shows a block diagram of a flow chart of an embodiment of a method 60 for a network component 300. The network component 300 is comprised in a vehicular network using platooning. The method 60 comprises communicating 62 traffic information with one or more vehicles. The method further comprises determining 64 a warning message trigger condition for triggering transmission of a warning message based on the traffic information. The warning message comprises information on a detection of a potential intruder 160 for a platoon 202 at the vehicle 100. The method 60 comprises communicating 66 information on the warning message trigger condition to one or more vehicles.

As already mentioned, in embodiments the respective methods may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a (non-transitory) computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

LIST OF REFERENCE SIGNS 10 apparatus for a vehicle
12 one or more interfaces
14 control module
20 apparatus for a platooning vehicle
22 one or more interfaces
24 control module
30 apparatus for a network component
32 one or more interfaces
34 control module
40 method for a vehicle
42 receiving
44 detecting
46 generating
48 communicating
50 method for platooning vehicle
52 receiving
54 initiating
60 method for network component
62 communicating
64 determining
66 communicating
100 vehicle
160 passing vehicle
170 oncoming vehicle
200 platooning vehicle
210 platooning vehicle
220 platooning vehicle
300 network component
400 system

The invention claimed is:

1. An apparatus for a first vehicle outside a platoon of vehicles, the apparatus comprising:
one or more interfaces configured to communicate in a mobile communication system;
a control module configured to control the one or more interfaces, wherein the control module is further configured to
receive one or more messages from one or more second vehicles, the one or more messages comprising information on at least a velocity and a location of a second vehicle of the one or more second vehicles,
detect a potential intruder for the platoon of vehicles among the one or more second vehicles based on the one or more messages from the one or more second vehicles and based on a warning message trigger condition,
generate a warning message for the platoon of vehicles, and
communicate the warning message to one or more other vehicles.

2. The apparatus of claim 1, wherein the control module is configured to detect the potential intruder further based on the sensor data of the first vehicle, and/or wherein the one or more messages from the one or more second vehicles include information on sensor data of the one or more second vehicles, wherein the control module is configured to detect the potential intruder further based on the information on the sensor data.

3. The apparatus of claim 1, wherein the control module is configured to establish a multi hop vehicular network with surrounding vehicles.

4. The apparatus of claim 3, wherein the control module is configured to limit the multi hop network by a maximum number of tiers of vehicles, wherein information on the maximum number of tiers of vehicles is based on one or more elements or a combination of the elements of the group of a configuration message received from the one or more other vehicles, a configuration message received from a platooning vehicle, a configuration message received from a network component, and a traffic condition of the first vehicle.

5. The apparatus of claim 1, wherein the control module is configured to detect whether the potential intruder is present upon request from a platooning vehicle, wherein the control module is configured to detect the potential intruder by determining whether a vehicle of the one or more second vehicles is going to overtake or pass the platoon, and/or wherein the control module is configured to determine the warning message trigger condition further based on one or more elements or a combination of the elements of the group of a configuration message received from the one or more other vehicles, a configuration message received from the platooning vehicle, a configuration message received from a network component, and a traffic condition of the first vehicle.

6. A vehicle comprising the apparatus of claim 1.

7. The apparatus of claim 1, wherein the control module is configured to communicate information on the warning message trigger condition with the one or more other vehicles.

8. A dual-role vehicle comprising the apparatus of claim 1, wherein the apparatus of claim 1 is outside a first platoon of vehicles and the dual-role vehicle further comprising a platooning apparatus, the dual-role vehicle being a member of a second platoon of vehicles, the platooning apparatus comprising:
one or more interfaces configured to communicate in a mobile communication system;
a control module configured to control the one or more interfaces, wherein the control module is further configured to:
receive a warning message at the dual-role vehicle from an outside-vehicle outside the second platoon, the warning message comprising information on a detection of a potential intruder for the second platoon; and
initiate one or more precautionary functions for the intruder.

9. An apparatus for a platooning vehicle, the platooning vehicle being a member of a platoon of vehicles, the apparatus comprising:
one or more interfaces configured to communicate in a mobile communication system;
a control module configured to control the one or more interfaces, wherein the control module is further configured to:
receive a warning message from a vehicle outside the platoon, the warning message comprising information on a detection of a potential intruder for the platoon at the vehicle; and
initiate one or more precautionary functions for the intruder.

10. The apparatus of claim 9, wherein the control module is configured to generate a configuration message for one or more vehicles outside the platoon, the configuration message comprising information on a warning message trigger condition, which instructs the vehicle outside the platoon to generate the warning message in case a potential intruder for the platoon is detected, and to communicate information on the configuration message to one or more vehicles outside the platoon using the one or more interfaces.

11. The apparatus of claim 10, wherein the control module is further configured to include information on establishing a multi hop network among vehicles outside the platoon for generating a warning message on potential intruders.

12. A vehicle comprising the apparatus of claim 9.

13. An apparatus for a network component, the network component being comprised in a vehicular network using platooning, the apparatus comprising:
one or more interfaces configured to communicate in a mobile communication system;
a control module configured to control the one or more interfaces, wherein the control module is further configured to:
communicate traffic information with one or more vehicles using the one or more interfaces,
determine a warning message trigger condition for triggering transmission of a warning message based on the traffic information, the warning message comprises information on a detection of a potential intruder for a platoon of vehicles at a vehicle outside the platoon, and
communicate information on the warning message trigger condition to one or more vehicles outside the platoon.

14. The apparatus of claim 13, wherein the control module is configured to determine different warning message trigger conditions depending on different traffic conditions of the one or more vehicles.

15. A method for a vehicle outside a platoon of vehicles, the method comprising:
receiving one or more messages from one or more other vehicles, the one or more messages comprising information on velocities and locations of the one or more other vehicles,
detecting a potential intruder for the platoon of vehicles among the other vehicles based on the one or more messages from the one or more other vehicles and based on a warning message trigger condition,
generating a warning message for the platoon of vehicles, and
communicating the warning message to the one or more other vehicles.

16. A non-transitory, computer-readable medium having a program code for performing the method of claim 15, when the program code is executed on a computer, a processor, or a programmable hardware component.

17. A method for a platooning vehicle, the platooning vehicle being a member of a platoon of vehicles, the method comprising:
receiving a warning message from a vehicle outside the platoon, the warning message comprising information on a detection of a potential intruder for the platoon at the vehicle; and
initiating one or more precautionary functions for the intruder.

18. A non-transitory, computer-readable medium having a program code for performing the method of claim 17, when the program code is executed on a computer, a processor, or a programmable hardware component.

19. A method for a network component, the network component being comprised in a vehicular network using platooning, the method comprising:
communicating traffic information with one or more vehicles;
determining a warning message trigger condition for triggering transmission of a warning message based on the traffic information, the warning message comprises information on a detection of a potential intruder for a platoon of vehicles at a vehicle outside the platoon; and
communicating information on the warning message trigger condition to one or more vehicles outside the platoon.

20. A non-transitory, computer-readable medium having a program code for performing the method of claim 19, when the program code is executed on a computer, a processor, or a programmable hardware component.

* * * * *